(12) United States Patent
Tomerlin et al.

(10) Patent No.: US 7,546,899 B2
(45) Date of Patent: Jun. 16, 2009

(54) LIGHTWEIGHT POLYMER MUFFLER APPARATUS AND METHOD OF MAKING SAME

(75) Inventors: Reg Tomerlin, Los Angeles, CA (US); David S. Larner, Fountain Valley, CA (US); Kathy Jun, Cerritos, CA (US)

(73) Assignee: Arrowhead Products Corporation, Los Alamitos, CA (US)

( * ) Notice: Subject to any disclaimer, the term of this patent is extended or adjusted under 35 U.S.C. 154(b) by 387 days.

(21) Appl. No.: 11/243,914

(22) Filed: Oct. 5, 2005

(65) Prior Publication Data

US 2007/0074930 A1    Apr. 5, 2007

(51) Int. Cl.
*F01N 1/10* (2006.01)
*F01N 1/04* (2006.01)
*F01N 1/24* (2006.01)
*F16L 11/15* (2006.01)
*F16L 11/26* (2006.01)
*F01N 1/02* (2006.01)
*F16L 11/12* (2006.01)

(52) U.S. Cl. .................. 181/252; 181/256; 285/49
(58) Field of Classification Search .................. 181/252, 181/256, 222, 246, 244, 248; 285/299, 49
See application file for complete search history.

(56) References Cited

U.S. PATENT DOCUMENTS

| | | | |
|---|---|---|---|
| 2,739,616 A | | 3/1956 | Duff |
| 3,345,245 A | * | 10/1967 | Hanusa ........................ 428/160 |
| 3,374,856 A | | 3/1968 | Wirt |
| 3,598,199 A | | 8/1971 | Mertens et al. |
| 3,605,817 A | | 9/1971 | Bauman et al. |
| 3,837,364 A | | 9/1974 | Jenner |
| 3,903,928 A | * | 9/1975 | Sykes et al. .................. 138/109 |
| 3,913,625 A | * | 10/1975 | Gazda et al. .................. 138/140 |
| 4,183,378 A | | 1/1980 | Decker |
| 4,315,558 A | * | 2/1982 | Katayama .................... 181/227 |
| 4,615,411 A | | 10/1986 | Breitscheidel |
| 4,651,781 A | * | 3/1987 | Kandelman .................. 138/30 |
| 4,867,269 A | | 9/1989 | Lalikos et al. |
| 5,004,018 A | * | 4/1991 | Bainbridge .................. 138/149 |
| 5,060,697 A | | 10/1991 | Weinheimer |

(Continued)

FOREIGN PATENT DOCUMENTS

JP          60247005 A  *  12/1985

(Continued)

OTHER PUBLICATIONS

"Inspec Foams—SOLIMIDE Polyimide Acoustical and Thermal Aircraft Insulation Foam", http://www.aerospace-technology.com/contractors/thermal/inspec/.*

*Primary Examiner*—Edgardo San Martin
(74) *Attorney, Agent, or Firm*—Fulwider Patton LLP

(57) ABSTRACT

An environmental control system muffler including a thin wall polyetherether ketone (PEEK) cover tube, an open cell polymer attenuator tube slip fit there into and polymer end fitting securing the two tubes together and cooperating to form a pneumatic seal with the cover tube. The method of making the muffler apparatus includes the selection of tubing constructed of such PEEK corrugated construction and the open cell polymer noise attenuation construction, telescoping the tubes together and securing the end fittings thereto.

9 Claims, 4 Drawing Sheets

U.S. PATENT DOCUMENTS

| | | | |
|---|---|---|---|
| 5,092,122 A * | 3/1992 | Bainbridge | 60/272 |
| 5,148,837 A * | 9/1992 | .ANG.gren et al. | 138/121 |
| 5,163,289 A * | 11/1992 | Bainbridge | 60/274 |
| 5,413,147 A * | 5/1995 | Moreiras et al. | 138/109 |
| 5,548,093 A | 8/1996 | Sato et al. | |
| 5,723,828 A | 3/1998 | Nakagawa | |
| 5,731,557 A * | 3/1998 | Norres et al. | 181/233 |
| 5,765,257 A * | 6/1998 | Steger et al. | 15/326 |
| 5,792,532 A | 8/1998 | Pfleger | |
| 5,888,601 A * | 3/1999 | Quigley et al. | 428/36.1 |
| 5,908,049 A * | 6/1999 | Williams et al. | 138/125 |
| 5,924,456 A | 7/1999 | Simon | |
| 6,016,848 A | 1/2000 | Egres, Jr. | |
| 6,039,082 A | 3/2000 | Winter et al. | |
| 6,161,591 A | 12/2000 | Winter et al. | |
| 6,180,197 B1 * | 1/2001 | Nie et al. | 428/36.91 |
| 6,354,332 B1 * | 3/2002 | Burkhardt et al. | 138/109 |
| 6,386,316 B1 | 5/2002 | Lepoutre | |
| 6,491,067 B1 * | 12/2002 | Davenport et al. | 138/110 |
| 6,585,718 B2 | 7/2003 | Hayzelden | |
| 6,622,818 B2 | 9/2003 | Jenvey | |
| 6,715,580 B1 | 4/2004 | Gerstner et al. | |
| 6,772,858 B2 | 8/2004 | Trochon | |
| 6,840,746 B2 * | 1/2005 | Marshall et al. | 417/312 |
| 6,877,472 B2 * | 4/2005 | Lepoutre | 123/184.61 |
| 6,948,479 B1 * | 9/2005 | Raney et al. | 123/456 |
| 7,089,965 B2 * | 8/2006 | Cheng et al. | 138/121 |
| 2001/0015302 A1 * | 8/2001 | Lundgren | 181/252 |
| 2002/0006523 A1 | 1/2002 | Obeshaw | |
| 2003/0172981 A1 | 9/2003 | Gibson | |
| 2004/0060609 A1 | 4/2004 | Fatato et al. | |
| 2005/0167192 A1 * | 8/2005 | Simon | 181/256 |
| 2006/0196568 A1 * | 9/2006 | Leeser et al. | 138/149 |

FOREIGN PATENT DOCUMENTS

JP   06146844 A *  5/1994

* cited by examiner

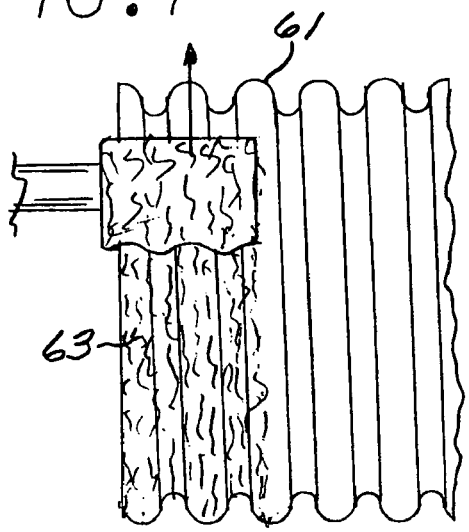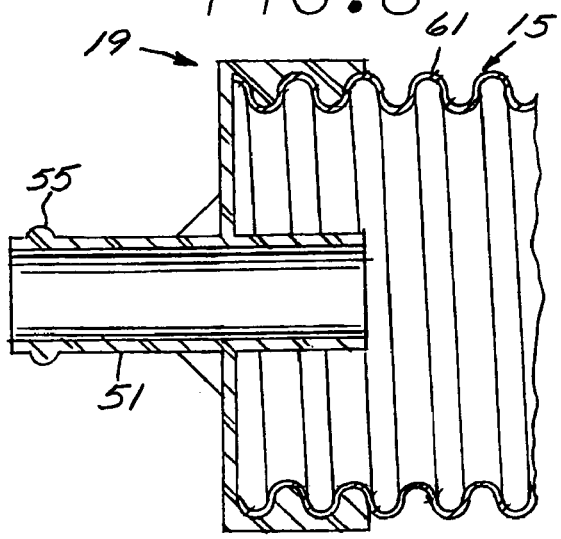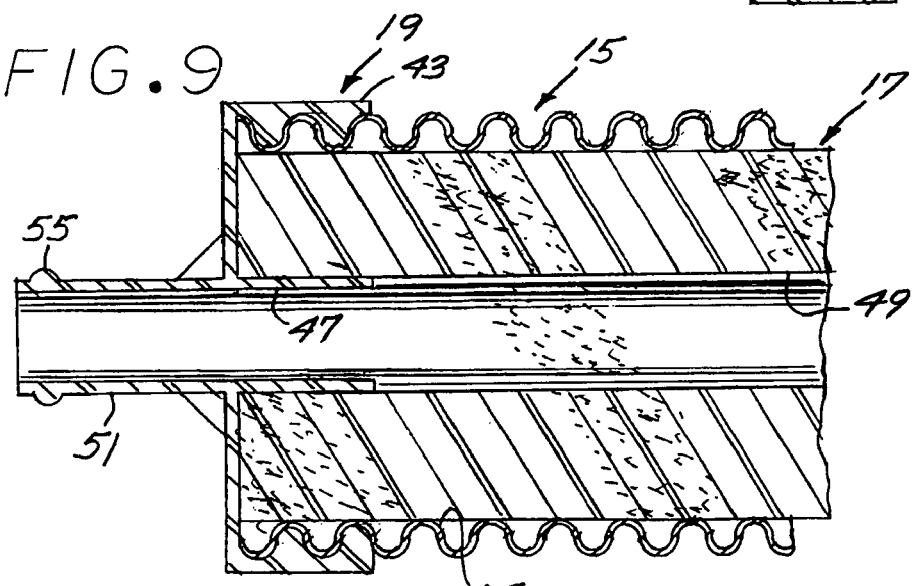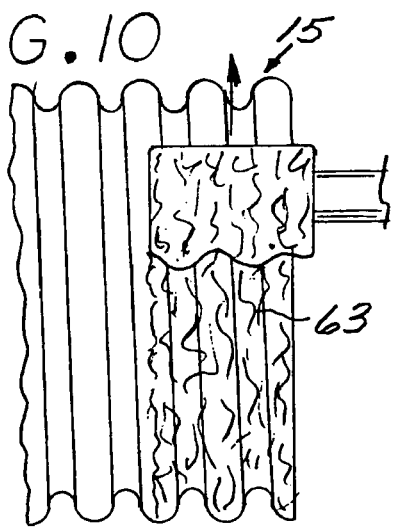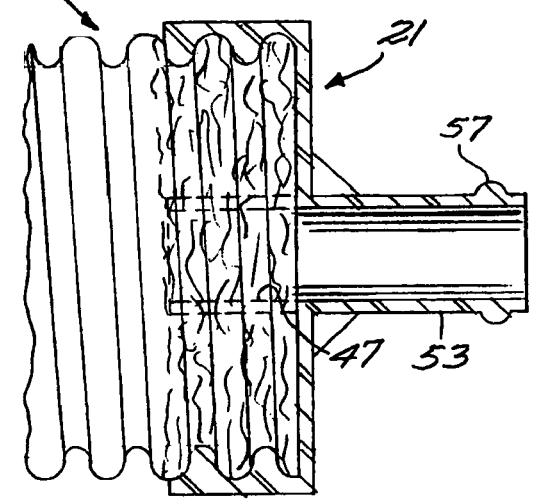

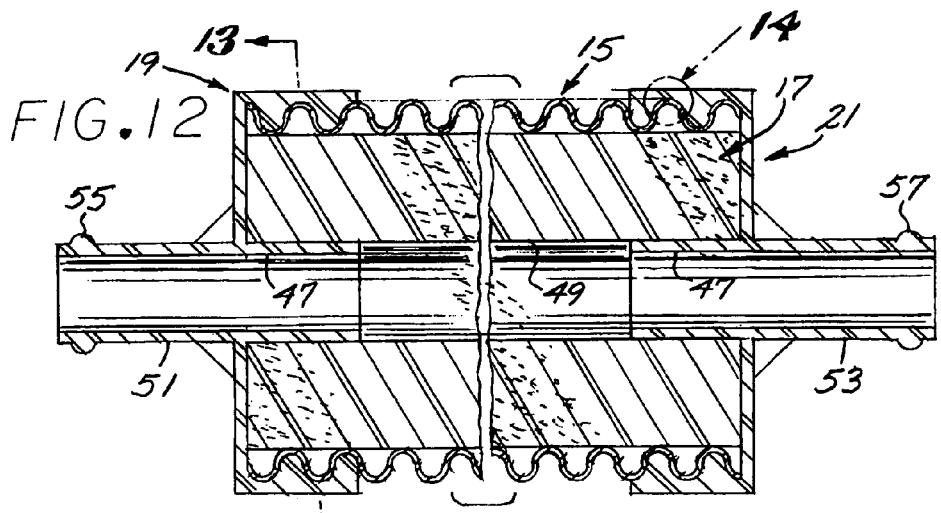
FIG.12
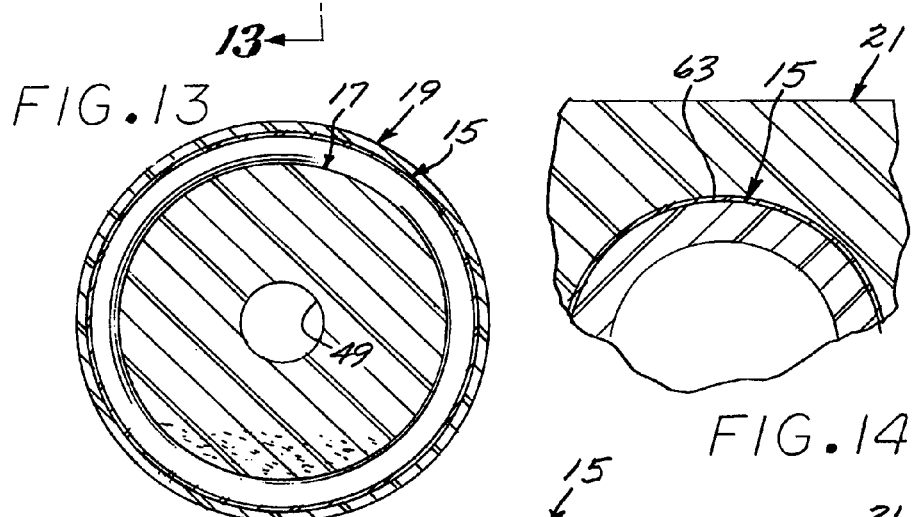
FIG.13
FIG.14
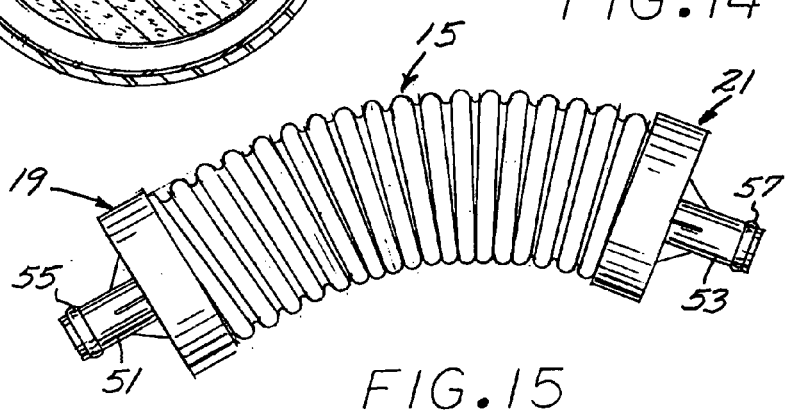
FIG.15

LIGHTWEIGHT POLYMER MUFFLER APPARATUS AND METHOD OF MAKING SAME

BACKGROUND OF THE INVENTION

1. Field of the Invention

The present invention relates to environmental control systems for mass transit vehicles, such as aircraft, ships and trains.

2. Description of the Related Art

In the design and manufacture of mass transit vehicles such as transport aircraft, it is necessary to provide ducting for flow of gasses such as air through air conditioning systems leading to different locations throughout the fuselage. Depending on the rate of mass transfer and speed of flow, vibration transmission characteristics of the ducting and the surrounding frame structure, the noise emanating from the gas flow can be relatively loud, even to the point of distraction or irritation for crew members and passengers alike.

Constraints on design criteria for such environmental control system ducting stem from governmental and industrial regulations which focus on the safety of personnel in the event of a catastrophe such as an airplane accident or crash. These constraints include attention given to flammability, toxicity, smoke generation generated from vaporized combustibles. Furthermore, in the highly competitive nature of the aircraft industry, it is important such ducting be relatively economical and of a light weight so as not to heavily burden the overall weight of the aircraft or otherwise upset the balance of weight distribution throughout the fuselage.

It has been common practice to construct such environmental control system mufflers of non-metallic materials such as polyurethane and nylon with fiberglass batting as an acoustic absorbers. A typical muffler will incorporate a knitted sleeve placed on a tubular mandrel and over wound with steel wire and adhesively received together by polyurethane or silicone adhesives in what is termed a "wet winding" process. The external wall of such prior art mufflers typically consist of coated fabrics or films reinforced by winding a small cording of nylon or other polymer thereabout and adhering such cording by adhesive or heat sealing in the winding process. Closure caps are typically provided at the opposite ends of the muffler and are typically made from a rather complex lay up process using coated fabrics and adhesives.

The manufacture and assembly of such prior art mufflers is typically labor intensive requiring some degree of technical skills and is relatively time consuming thus driving up the cost of manufacture in an industry where the skilled labor is relatively expensive. In this regard, it is recognized that the addition of just one pound to the weight of an aircraft might add hundreds of dollars to the expense of operating the aircraft over its useful life. Additionally, for large jumbo aircrafts of present day design, just one aircraft might incorporate 100-200 or even more muffler devices.

Thus, there exists a need for a lightweight, low cost muffler apparatus which can be manufactured and assembled in a relatively economical manner and which will provide effective noise attenuation and provide a relatively low level of flammability, toxicity and smoke generation in the event of fire.

SUMMARY OF THE INVENTION

The muffler of the present invention employs a combination of flexible foam or foams having a density selected and arranged for optimal attenuation across a spectrum of sound frequencies or noise. An envelope is formed by a thin wall, flexible cover tube constructed of low flammability, smoke generation, and toxicity thermoplastic. An attenuation tube of open cell polymer foam such as a lightweight, fire resistant, polyimide foam known as SOLIMIDE, or melamine foam is received in telescopical relation in the cover tube and secured in place by end fittings.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 7 is a partial front view of, in enlarged scale, showing adhesive being applied to the end extremity of a length tubing showing in FIG. 1;

FIG. 8 is a longitudinal sectional view similar to FIG. 6 but in enlarged scale and showing an end fitting being screw thread into the length of exterior tubing shown in FIG. 1;

FIG. 9 is a longitudinal sectional view, in enlarged scale, similar to FIG. 3 and depicting an end cap applied to lengths of tubes shown in FIG. 1;

FIG. 10 is a front view similar to FIG. 7 but showing sealant being applied to the opposite ends of the exterior tube;

FIG. 11 is a front view similar to FIG. 8 but showing end cap being threaded onto the end of the exterior tubing;

FIG. 12 is a broken longitudinal sectional view showing a muffler apparatus constructed in accordance with the method of the present invention;

FIG. 13 is a transverse sectional view taken along the line 13-13 of FIG. 12;

FIG. 14 is a detailed sectional view, in enlarged scale, taken from the circle 14 in FIG. 12; and FIG. 15 is a front view, in reduced scale, of the muffler shown in FIG. 12 depicting the muffler in its flex position.

DETAILED DESCRIPTION OF THE INVENTION

Figure 1:
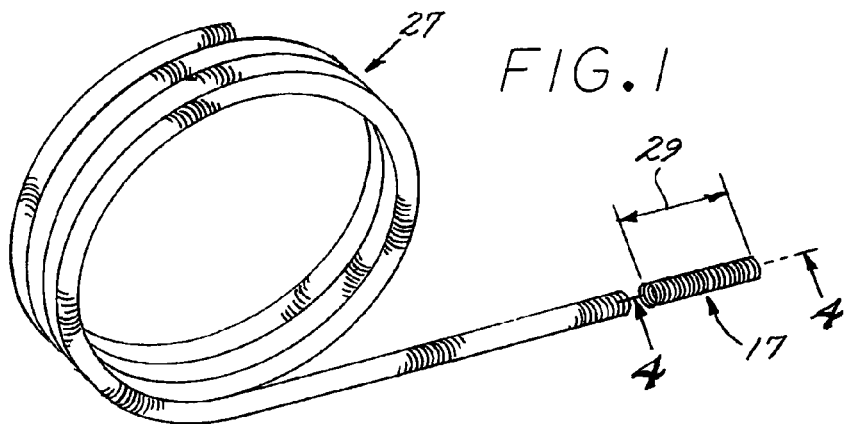
FIG. 1 is a perspective view of a coil of flexible polymer cover tubing used in the preferred embodiment of the muffler apparatus of the present invention.
Figure 2:
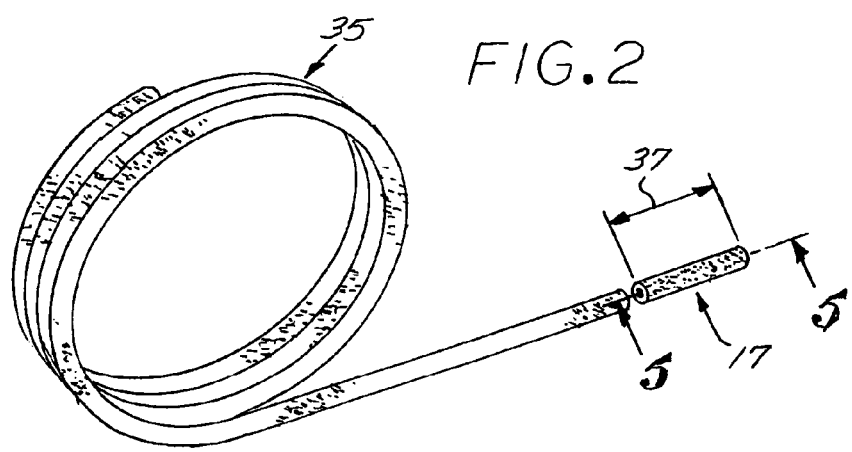
FIG. 2 is a perspective view of an acoustical attenuating tubing which may be used in preferred embodiment of the present invention.
Figure 3:
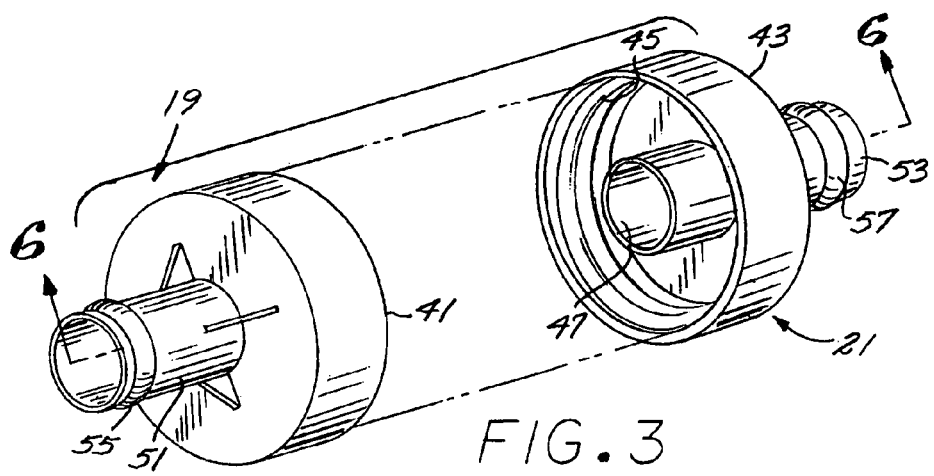
FIG. 3 is a partial perspective view, in enlarged scale, of end caps that may be utilized with lengths of the tubes shown in FIGS. 1 and 2 muffler apparatus of the present invention.

Referring to FIGS. 1 and 2, the environmental control system (ECS) muffler of the present invention includes, generally, an exterior envelope employing a flame resistant lightweight, flexible polymer cover tube 15 cooperating to form an envelope over an open cell self-supporting polymer attenuating tube 17, the tubes being joined at there opposite ends by end fittings 19 and 21 affixed thereto.

In the manufacture of common carriers, such as aircraft, it has been common practice to flow air conditioning air through noise attenuated ducting to thereby add to passenger comfort by maintaining the desired environmental temperature and muffling the noise generated by the air flow. As the size of the aircraft has increased, both dimensionally and in load carrying capacity, the demand for weight saving components has risen. It has been recognized that the addition of sound insulation to air conditioning ducting often times results in added weight which, depending on where installed, upsetting the weight distribution within the fuselage design which may lead to design modifications in order to maintain flight stability. In the routing of the ducting through the confines of framework in the airplane fuselage it is beneficial that the ducting be flexible so that, to at least some degree, bends and turns may be accommodated without the necessity of manufacturing special jigs and fixtures to form the contours for rigid ducting and undertaking the time consuming task of threading the rigid formed ducting into the often times tortured route through the fuselage components near the conclusion of the fuselage assembly.

Present day practice in airplane ducting typically involves lining a polyurethane tube with a nylon and fiberglass batting acoustic absorber lined interiorly with a distended wire, knitted sleeve bonded in place by a wet adhesive to support the absorber batting and protect the surface thereof against dislodgement under the forces generated by flexing of the walls of the ducting under pressure and temperature fluctuations. The resultant ducting system is relatively expensive to manufacture and adds considerably to the weight of the final aircraft. It is these problems to which the present invention is directed.

In current day applications, sound attenuation ducting may extend over several feet or even over hundreds of feet in a heavy commercial airplane fuselage thus adding significant weight to the aircraft, even to the point where the aircraft itself may not meet specifications. It is desirable that the walls of the covering tube 15 and acoustical tube 17 are lightweight and also flexible so that the resultant muffler can be flexed to accommodate undulations in the path it is to be installed to thread through the various circuitous routes through the airplane fuselage. In this regard, the covering tube 15 is constructed of a thin wall flame resistant polymer such as one of the ketones and preferably polyetherether ketone (PEEK) and may have a thickness of between 0.005 and 0.020 inches, preferably about 0.010 inches thick to reduce weight. The covering tube may be extruded and corrugated with a helical corrugation to thus enhance the radial strength thereof for accommodating positive and negative pressure differential there across and for maintaining the flexibility thereof for accommodating flexture to assume various longitudinal contours.

Typically, the tube 15 will have a maximum outside diameter measured from the maximum amplitude of the crests of the respective convolutions ranging between about 1½ to 15 inches with the minimum diameters of such convolutions measured from the respective troughs ranging from about ¾ to 14 inches. In one preferred embodiment, the convolutions forming the corrugations have a 4 inch maximum outside diameter and a minimum outside diameter of 3½ inches to provide an amplitude of substantially ¼ inch from the bottom to the top of the respective convolutions. We have found that with such thin walled PEEK material, the cover tubing may be manufactured in long lengths and coiled in a coil, generally designated 25, (FIG. 1) for convenient storage and ready availability for manufacturing purposes. At the time of manufacture, the tubing may be uncoiled from the coil 27 and the cut to the perspective muffler lengths 29 to form a covering tube 15 having a length of, for instance, ½ to 2 meters or more for use in fabricating a muffler of that approximate length.

We have discovered certain open cell polymer foams such as a polyimide foam SOLIMIDE or melamine foam, when properly formed, have sufficient rigidity and body to maintain a tube shape and present sufficient structural integrity to be exposed directly to relatively high mass flow without breaking down and separating or flaking off thus eliminating any necessity of an internal liner to line the surface exposed to the air flow itself. We discovered that this construction can provide highly effective sound attenuation and provide for ready assembly in a non labor intensive manner thus minimize expense while providing a highly reliable, effective construction. Examples of such open cell polymer foams include polyimides such as the lightweight, fire resistant polyimide foam manufactured by Inspec Foams, Inc. of Dallas, Tex. and sold under the trade name SOLIMIDE available under military specification MIL-T-24708 and a melamine resin foam such as that available from American Micro Industries. The noise reduction coefficient (NRC) (arithmetic average absorption at 250, 500, 1000, and 2000 hz) 0.44 lb per cu. ft. density of SOLIMIDE polyimide foam is 0.79 and for Melamine with a density of 0.65 lb per cu. ft. 63. Testing has proven that these lightweight polyimide open cell foam materials perform satisfactorily for absorbing the noise typically associated with air flow in airplane environmental control systems which in current day applications, could involve flow rates in the order of 150 pounds per minute at sea level thus requiring substantial capacity and, with present day construction, an extreme addition of weight.

The attenuator tube 17 will typically have an outside diameter in the order of 1½ to 4 inches and may be constructed with a wall thickness of about 1.5 to 2.5 centimeters or more. The attenuator tube may likewise be constructed from elongated flexible tubing coiled in a coil, generally designated 35 (FIG. 2) for convenient storage and transportation and for ready availability at the manufacturing site. The length of such tubing will typically be cut off to form the acoustical tube 17 having a length 37 corresponding the length 29 for the covering tube 15.

The end fittings 19 and 21 may be constructed of a lightweight polymer as for instance, injection molded PEEK and will typically be formed with respective cup shaped housings 41 and 43 with respective cylindrical walls having interior diameters corresponding with the exterior diameter of the covering tube 15 and preferably configured with internal screw threads 35 of a depth and pitch corresponding with the helical configuration of the corrugations in the covering tube 15. The respective fittings 19 and 21 are, in the preferred embodiment, formed with longitudinally inwardly directed axial nipples 47 having exterior diameters corresponding with interior diameter 49 of the acoustical tube 17 (FIG. 9). As will be appreciated by those skilled in the art, connection of the acoustical tube may be slip fit as shown or may be threaded or by bonding or any other securing means. The fittings 19 and 21 are further formed with axially outwardly projecting bosses 51 and 53 configured with external peripheral connector rings 55 and 57, respectively, for connection with ducting incorporated in the environmental control system itself.

Figure 4:
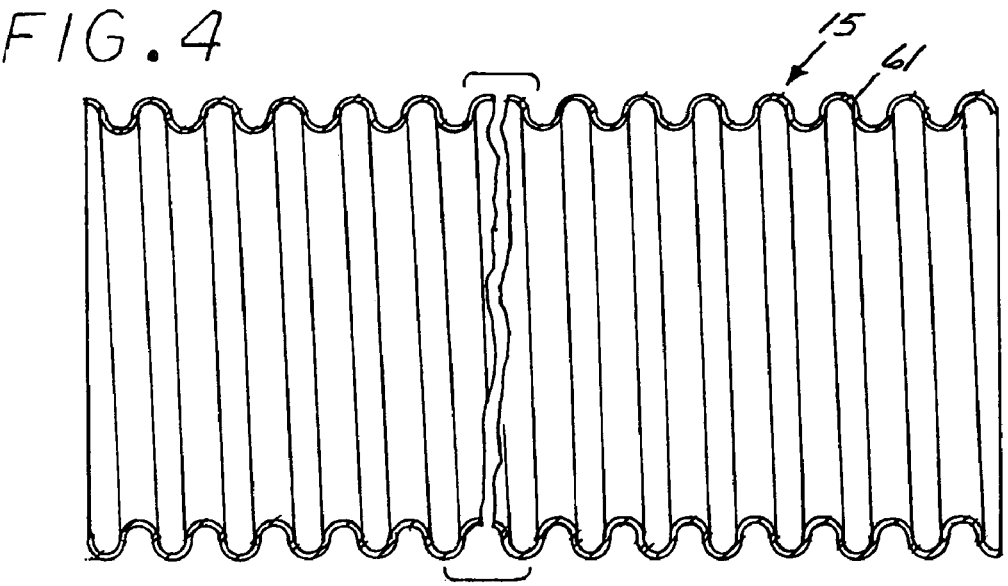
FIG. 4 is a broken longitudinal sectional view, in enlarged scale, taken along the lines 4-4 of FIG. 1.
Figure 5:
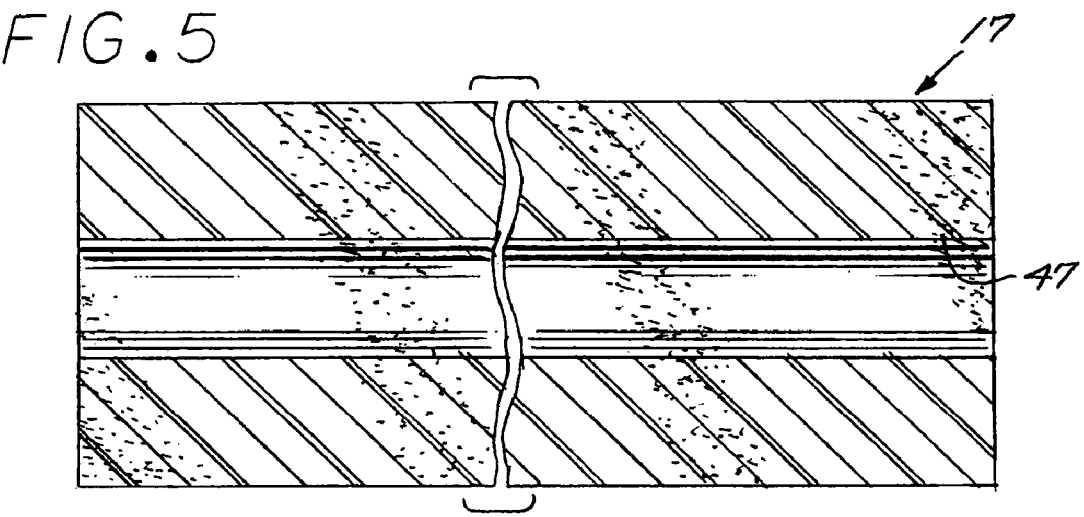
FIG. 5 is a broken longitudinal sectional view, in enlarged scale, taken along the line 5-5 of FIG. 2.
Figure 6:
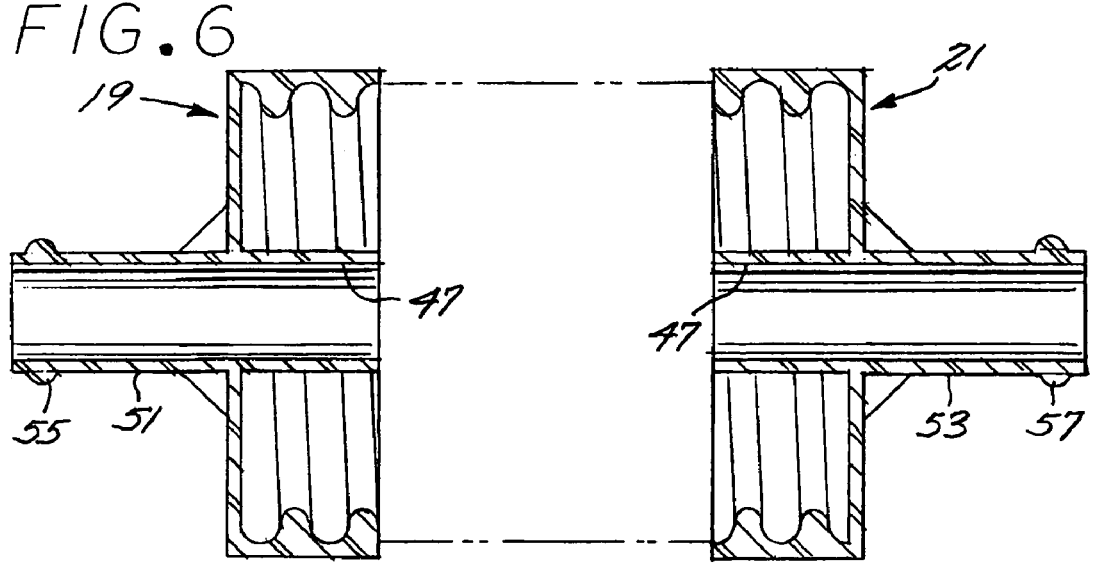
FIG. 6 is a longitudinal sectional view, in enlarged scale, taken along the line 6-6 of FIG. 3.

In constructing the muffler of the present invention, it will be appreciated that the coil 27 of covering tubing may be fabricated by injecting a thin wall tube of polymer which possesses desirable characteristics for flammability, generation of smoke and toxicity (FST). It has been found that PEEK provides a favorable FST rating and is also lightweight and flexible and can be readily formed to a helical rib defining, for example, convolutions 61 having an amplitude in the range of ½ to 1 inch, depending on the nominal diameter of the muffler (FIG. 4) which cooperate in providing reinforcement against radial expansion or contraction of the wall of the resulted tube 17 and which cooperate in adding to the flexibility of the resultant muffler (FIG. 15).

The raw material for the tube 17 may be in the form of an open cell polyimide or melamine any other open cell polymer foam having the structural integrity to maintain a tubular shape in combination with the covering tube to withstand flexure corresponding with positive and negative air pressure on the order of 5 to 10 psi.

It has been found that an open cell polyimide foam such as SOLIMIDE polyimide foam having a density of 0.44 lb per cu. ft. will provide the necessary structural integrity and also the flexibility to the point where it can be coiled in a coil 35 (FIG. 2) for the purpose of storage and the ready availability for manufacturing purposes and to also accommodate flexing and bending in the muffler structure shown in FIG. 15. Other examples include generic polyimide foam and melamine having a density of 0.65 lb per cu. ft.

In practice, the coils 37 and 35 will be moved into the manufacturing area and the tubing unrolled and lengths of covering tube 17 severed from the body of the coil and the acoustic tube 17 severed from the body of the coil 35 to provide tubes of substantially the same length. An adhesive 61 (FIG. 7) may be applied to the exterior of the convolution 61 forming the covering tube 15. The fitting 19 may then be screwed into place as shown in FIG. 8 and the adhesive permitted to cure. The acoustic tube 17 may then be telescoped into the interior of the tube 15 from the open end to be received over the nipple set 47 of the end fitting 19 as shown in FIG. 19.

Adhesive 63 may then be applied to the opposite end of the tube 15 as shown in FIG. 10 and the end fitting 21 then screwed into place with the nipple 47 received in the interior of the tube 17 to cooperate in holding the components in position. In some instances, adhesive may be applied of the respective nipples 47.

The assembled muffler as shown in FIG. 12 will then be in condition to be selectively installed in the environmental control system of a common carrier such as a aircraft or even a space vehicle. It will be appreciated that the relatively lightweight of the thin walled covering tube 15 and acoustical tube 17, as well as that of the end fittings 19 and 21, will provide an overall weight which may be on the order of ½ that of conventional sound attenuation systems for carrying the same volume of air. The ends of the covering tube 15 are adhered to the fillings 19 and 21 to provide a pneumatic seal and the attenuation tube will muffle the sound of the air flow therethrough. Moreover, the manufacturing process described is relatively straight forward and can be achieved relatively quickly by comparatively unskilled labor thus attributing to the relatively economical construction of the muffler.

From the foregoing, it will be appreciated the muffler of the present invention method of making same provides a relatively inexpensive lightweight muffler which will meet even though the most stringent flammability, smoke and toxicity tests.

We claim:

1. An aerospace environmental control system muffler apparatus for flowing a stream of conditioning air and comprising:
   a polymeric corrugated cover tube having a cover wall thickness of no more than 0.020 inches;
   an open cell polymer attenuator tube slip fit into the cover tube to be constrained therein and including a low toxicity, smoke and high temperature resistant self supporting wall having a longitudinal inner surface defining an elongated through passage and resistant to separation of the open cell polymer as the air flows longitudinally there along in intimate flow relationship; and
   end fittings secured to the opposite ends of the tubes and affixing the tubes together.

2. The muffler apparatus of claim 1 wherein:
   the cover tube is constructed with the cover wall substantially 0.010 inches thick.

3. The muffler apparatus of claim 1 wherein:
   the cover tube is constructed of polyetherether ketone.

4. The muffler apparatus of claim 1 wherein:
   the attenuator tube is constructed of lightweight, flame resistant SOLIMIDE foam.

5. The muffler apparatus of claim 1 wherein:
   the attenuator tube is constructed melamine.

6. The muffler apparatus of claim 1 wherein:
   the attenuator tube is constructed with a 2½ inch inside diameter.

7. An aerospace environmental control system muffler apparatus as set forth in claim 1 for use in flowing the air at a predetermined flow rate of at least 150 pounds per minute at sea level and wherein:
   the attenuator tube is constructed with a wall thickness of at least 2.5 cm to flow.

8. An aerospace environmental control system muffler apparatus as set forth in claim 1 for use in flowing conditioning air at a predetermined flow rate of at least 150 pounds per minute as sea level and wherein:
   the attenuator tube is cylindrical and formed with an inside diameter defining the longitudinal inner surface and constructed sufficiently tough to resist separation from itself at the predetermined flow rate.

9. An aerospace environmental control system muffler apparatus for flowing a stream of conditioning air and comprising:
   an elongated flexible polymeric corrugated cover tube having a wall thickness of no more than 0.020 inches;
   an elongated flexible, flame resistant self supporting open cell polymer, distended wall defining an attenuator tube slip fit into the cover tube to be constrained therein and configured with an elongated inner surface defining a through passage to receive the air in intimate flow relationship to attenuate vibrations in the air; and
   end fittings secured to the opposite ends of the tubes and affixing the tubes together whereby the tubes may be flexed to assume different selected circuitous longitudinal configurations and the polymer wall will tend to remain distended to receive flow of the stream in intimate contact with the interior surface throughout the length thereof.

* * * * *